United States Patent [19]
Hodge

[11] Patent Number: 5,082,338
[45] Date of Patent: Jan. 21, 1992

[54] FIBER OPTIC CONDUIT-CONNECTOR ASSEMBLY

[76] Inventor: Ron Hodge, 1262 Providence Way, Lawrenceville, Ga. 30245

[21] Appl. No.: 444,447

[22] Filed: Dec. 1, 1989

[51] Int. Cl.[5] .............................................. G02B 6/36
[52] U.S. Cl. ..................................... 385/81; 138/127; 385/87
[58] Field of Search .......................... 350/96.23, 96.2; 138/111, 127, 129, 131, 139; 439/585; 379/110

[56] References Cited

U.S. PATENT DOCUMENTS

| | | | |
|---|---|---|---|
| 2,438,146 | 3/1948 | Candee et al. | 138/139 X |
| 2,832,374 | 3/1955 | November | 138/111 X |
| 3,517,375 | 6/1970 | Mancini | 439/585 |
| 4,312,563 | 1/1982 | Mead | 350/96.20 |
| 4,400,050 | 8/1983 | Hayward | 439/585 |
| 4,516,830 | 5/1985 | Guazzo | 350/96.23 X |
| 4,553,806 | 11/1985 | Forney, Jr. et al. | 439/585 X |
| 4,601,536 | 7/1986 | Guazzo | 350/96.20 |
| 4,695,127 | 9/1987 | Ohlhaber et al. | 350/96.23 |
| 4,695,128 | 9/1987 | Zimmerman et al. | 350/96.23 |
| 4,708,427 | 11/1987 | Ejiri et al. | 350/96.20 |
| 4,721,355 | 1/1988 | Gould | 350/96.20 |
| 4,733,935 | 3/1988 | Gandy | 350/96.21 |
| 4,798,441 | 1/1989 | Clark | 350/96.2 |
| 4,812,009 | 3/1989 | Carlisle et al. | 350/96.21 |

Primary Examiner—John D. Lee
Assistant Examiner—Stephen W. Barns

[57] ABSTRACT

The present invention relates to a novel fiber optic conduit-connector assembly for passing optical fibers between optoelectronic component housings. In one preferred embodiment, the conduit comprises a flexible, crush resistant and fluid resistant inner tube adapted for enclosing at least one optical fiber, a layer of electromagnetic shielding surrounding the inner tube, and an outer pressure tight layer surrounding the shielding layer. A connector adapted to allow at least one optical fiber to pass therethrough is fixedly attached to at least one end of the conduit by first stripping away the end portion of the outer layer of the conduit, inserting the inner tube of the conduit into one end of the connector and wrapping the shielding layer around the outer surface of the connector end. A thermofit ring is placed over the steel braiding and secures the braiding to the connector upon application of heat to the thermofit ring. A layer of heat shrink tubing is then placed over the thermofit ring and exposed inner layers of the conduit to provide a protective pressure proof layer. The other end of the connector is threaded to engage a standard coaxial cable entry port on an optoelectronic component casing.

25 Claims, 1 Drawing Sheet

FIBER OPTIC CONDUIT-CONNECTOR ASSEMBLY

BACKGROUND AND SUMMARY OF THE INVENTION

The present invention is directed to a fiber optic conduit-connector assembly for passing optical fibers between component housings. More specifically, this invention relates to a flexible, crush resistant and pressure tight conduit having at least one connector that is compatible with a standard RF coaxial cable entry port through which optical fiber pigtails are passed for connecting to other optical fibers or optoelectronic components.

Light wave communication over optical fibers has been effectively employed between the distribution headend and distribution nodes of broadband CATV systems. The distribution headend is the origination point of all signals carried on the system. The headend typically includes an antenna system, signal-processing equipment, combining networks and other related equipment. Television signals from commercial broadcast stations are collected from large "off air" television antennas and satellite earth receiving stations and transmitted to the signal processing equipment. The signal processor includes a number of electronic to the distribution network, filtering out unwanted signals, adjusting the output level or strength of the collected signals so that all signals that are carried have close to the same level, converting the collected signals to transmission channels that are optimized for application to the cable television system, and converting UHF signals to VHF cable channels. Finally, the combining network groups the signals for each cable channel into a single output for connection to the distribution network.

The portion of the distribution system which connects the headend output to the distribution nodes is generally called the trunk system and is designed for bulk transportation of multi-channeled broadband CATV signals throughout the area to be covered by the cable system. Typically, the trunk system consists of coaxial cable with a series or cascade of 20 or more trunk amplifiers installed at intervals along the coaxial cable. The trunk amplifiers are necessary to compensate for the inherent losses (attenuation) in signal strength resulting from transmission via coaxial cable. While trunk amplifiers are effective in compensating against signal loss, the amplifiers themselves introduce noise and distortion into the television signals carried by the system. In a CATV system where the subscriber area is large, the number of amplifiers required will be great, thereby increasing the amount of noise and distortion introduced into the system by these components.

The distribution nodes are the points at which signals from the trunk system are fed to a system of distribution lines that bring the signals to individual subscribers. Directional couplers and/or splitters are used to select a portion of the signal from a trunk amplifier to be fed to bridging amplifiers. Distribution or feeder lines are fed from each bridging amplifier to the subscriber areas, and signals are tapped from the feeder lines for connection to subscriber residences. The trunk cable continues to other distribution nodes, where the signals are routed through distribution lines to other subscribers.

Using fiber optic cable to replace the coaxial cable and trunk amplifier cascade forming the trunk system significantly reduces signal attenuation, noise and distortion in the CATV distribution system. Optical fibers have low signal attenuation in comparison to conventional coaxial cable. Thus, signals in the form of light may be transmitted for long distances over optical fibers without requiring amplification. Use of fiber optic transmission media eliminates the twenty or more trunk amplifiers needed in coaxial cable trunk systems and the noise and distortion caused by such amplifiers. The optical signals carried by the fiber optic trunk lines are converted to radio frequency (RF) electrical signals ("optoelectronic conversion") at the distribution nodes. The optoelectronic conversion provides broadband (e.g. 50–550 MHz) RF signals, which are then fed via bridging amplifiers to the feeder system of distribution lines to the individual subscribers.

In connecting optical fibers to the distribution nodes, a group of individual fibers is separated out from the bundle of fibers forming the fiber optic trunk cable. The separated fibers are then cut and connected to short lengths of optical fibers commonly referred to as pigtails. This connection may be accomplished, for example, by fusion splicing, which creates a permanent junction between the fiber ends. The splice connections are typically housed in splice enclosures, which serve to protect and organize the optical fiber splices. The opposite ends of the fiber optic pigtails are then inserted through an entry port in the housing for the optoelectronic conversion components for converting the optical signals to electrical RF signals.

Heretofore, fiber optic pigtails passing between a splice enclosure and an optoelectronic converter housing have been inserted through a plastic or vinyl tube. This tubing provided minimal protection for the fibers from moisture. The tubing was neither watertight nor pressure tight, nor did it protect the fibers from physical damage resulting from compressive or tensile forces. Also, this tubing decreased in flexibility at low temperatures. Additionally, the plastic or vinyl tubing did not prevent leakage of electromagnetic interference into the optoelectronic converter housing. This leakage could result in the introduction of noise into the converted electrical RF signals.

Accordingly, it is an object of this invention to provide a fiber optic conduit and connector that may be attached to a standard coaxial cable entry port.

It is another object of this invention to provide a fiber optic conduit and connector that is pressure tight and watertight.

It is still another object of this invention to provide a fiber optic conduit and connector that is shielded resistant and has high pull strength.

It is yet another object of this invention to provide a fiber optic conduit and connector that remains flexible throughout a wide range of operating temperatures.

It is a further object of this invention to provide a fiber optic conduit and connector that is shielded against leakage of electromagnetic interference.

These and other objects are achieved by the fiber optic conduit and connector of the present invention. In a preferred embodiment, the conduit has a highly flexible, crush resistant and fluid resistant inner tube formed of helically convoluted radiation-crosslinked, ethylene tetrafluoroethylene (ETFE). The inner tube is surrounded by a conductive material layer formed of braided stainless steel that provides both EMI shielding and tensile (pull) strength for the conduit-connector assembly. The outer layer of the conduit is formed of a moisture proof and pressure proof jacket formed of polypropylene that provides protection in an outdoor environment.

The connector is formed of a conductive, non-corrosive material, such as aluminum. In a preferred embodiment, the connector has a receptacle end for receiving the inner tube of the conduit that is internally threaded to threadingly engage the helical convolutions of the inner tube. The opposite end of the connector is adapted to engage a standard coaxial cable entry port.

The connector is permanently affixed to at least one end of the conduit by first stripping away the end portion of the outer jacket of the conduit, screwing the inner tube into the internally threaded receptacle end of the connector and wrapping the conductive shielding and pull strength layer around the outer surface of the connector receptacle end.

In one preferred embodiment, a thermofit ring is used to secure the connector to the conduit. Upon application of heat to the thermofit ring, the ring diameter shrinks, thereby crimping the shielding and pull strength layer to the outer surface of the connector end. A layer of heat shrink tubing is then placed over the thermofit ring and exposed inner layers of the conduit to provide a protective moisture proof and pressure proof layer.

In a second preferred embodiment, an externally threaded collet ring is placed over the shielding and pull strength layer and an internally threaded clamp nut is screwed onto the collet ring to secure the shielding and pull strength layer to the connector end. A layer of heat shrink tubing is then placed over the clamp nut and exposed inner layers of the conduit to provide a protective pressure proof layer. The inner diameters of the conduit inner tube and connector are sufficiently large to allow at least four optical fiber pigtails to pass through them.

DETAILED DESCRIPTION OF THE PREFERRED EMBODIMENT

Figure 1:
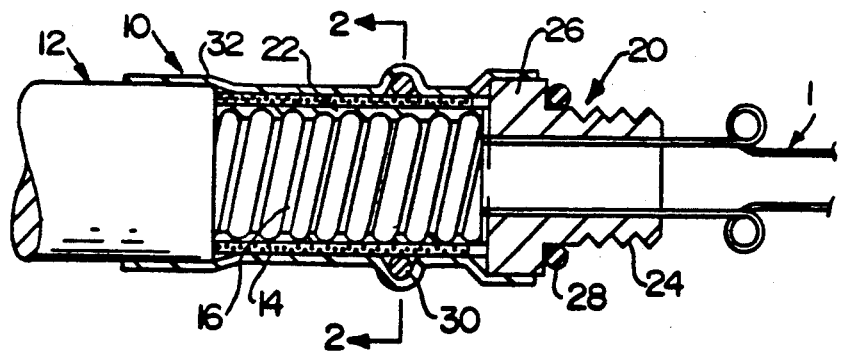
FIG. 1 is a longitudinal section of a first embodiment of the present invention.
Figure 2:
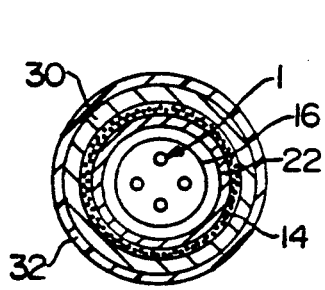
FIG. 2 is a section along a line 2—2 in FIG. 1.
Figure 4:
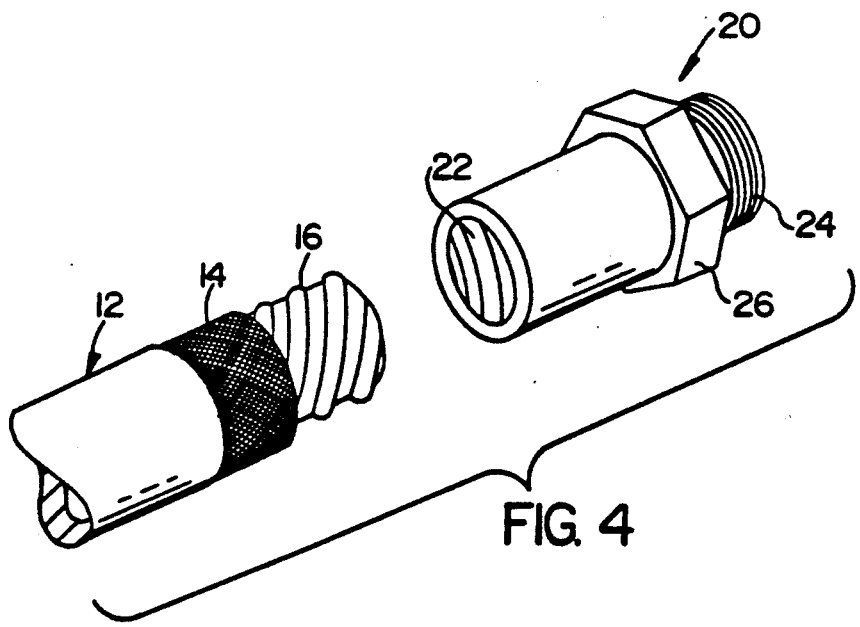
FIG. 4 is a broken-out perspective view of the embodiment of FIG. 1.

In one preferred embodiment, as best shown in FIGS. 1, 2 and 4, the conduit 10 includes a flexible, moisture proof and pressure proof outer layer 12 (e.g., polypropylene), a flexible, conductive, EMI shielding and tensile (pull) strength layer 14 (e.q , stainless steel or copper braiding) disposed within the outer layer 12 and a flexible, crush resistant and fluid resistant inner tube 16 formed of helically convoluted radiation-crosslinked ethylene tetrafluoroethylene (ETFE) disposed within the shielding and pull strength layer. The connector 20 is formed of an electrically conductive, non-corrosive material, preferably aluminum, however other materials, such as steel, brass, copper or conductive plastic, that allow an overall pull strength for the conduit-connector assembly of at least 100 pounds to be achieved may also be employed. The connector 20 has one receptacle end 22 for receiving the inner tube 16 of the conduit 10 and an opposite end 24 for connection to a standard coaxial cable entry port (not shown), such as a KS-type entry port. Preferably, the connector receptacle end 22 is internally threaded to threadingly engage the helically convoluted inner tube 16 that is inserted into the connector 20. The opposite connector end 24 is preferably externally threaded to threadingly engage a standard coaxial cable entry port. However, other methods for attaching the connector 20 to a coaxial cable entry port, including adapting the connector end 24 to slide through the coaxial cable entry port and using a retaining clip on the inside of the component housing to prevent the connector end 24 from being removed, or adapting connector end 24 to form a snap-in connector that slides through the coaxial cable entry port and locks onto the inside of the component housing. The connector also has a central nut portion 26 to facilitate mounting the connector-conduit assembly.

The connector 20 is fixedly attached to at least one end of conduit 10 by first stripping away the end portion of the outer layer 12 such that the shielding and pull strength layer 14 is exposed. The length of the stripped end portion of the outer layer 12 preferably should at least equal the length of the receptacle end 22 of connector 20, to insure that an adequate length of the shielding and pull strength layer is exposed. The end of inner tube 16 extending beyond the end of the outer jacket 12 is then inserted into the receptacle end 22 of connector 20. In the preferred embodiments shown in the accompanying figures, the helically convoluted inner tube 16 is screwed into the internally threaded receptacle end 22. The internal threads of end 22 of connector 20 are dimensioned to threadingly engage the helical convolutions of inner tube 16, thereby providing additional pull strength for the conduit-connector assembly. The shielding and pull strength layer 14 is slid over the outer surface of the receptacle end 22 of connector 20 as the inner tube 16 is inserted into the connector 20.

In the preferred embodiment shown in FIGS. 1, 2 and 4, a thermofit ring 30 is then slid over the shielding and pull strength layer 14 surrounding connector end 22. The thermofit ring 30 of known construction is formed of metal alloys such that upon the application of heat, for example, by a hot air gun, the diameter of the thermofit ring 30 shrinks in size. The diameter of thermofit ring 30 is sufficiently reduced to form a permanent connection between the shielding and pull strength layer 14 of conduit 10 and the receptacle end 22 of connector 20. A suitable commercially available thermofit ring is sold by Raychem Corp. under the name "Tinel-Lock Ring." A heat shrink tube 32 is placed around thermofit ring 30, shielding and pull strength layer 14 and a portion of the outer jacket 12 of conduit 10. The heat shrink tube 32 is reduced in diameter by heat application to form a watertight and pressure tight protective seal over the thermofit ring 30, shielding and pull strength 14 and outer jacket 12.

Figure 3:
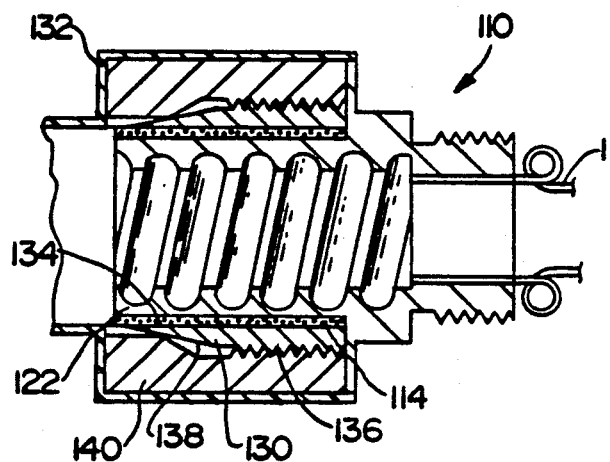
FIG. 3 is a longitudinal section of a second embodiment of the present invention.

In a second preferred embodiment shown in FIG. 3 a collet ring 130 is slid over the shielding and pull strength layer 114 surrounding connector end 122. A portion of the external surface 136 of the collet ring 130 is threaded for threaded engagement with the clamp nut 140. Clamp nut 140 is configured such that when it is screwed onto collet ring 130, the internal surface of clamp nut 140 contacts the non-threaded portion of the external surface 138 of collet ring 130 to form a permanent connection between the shielding and pull strength layer 114 of the conduit 110 and receptacle end 112 of connector 120. The inner surface 134 of the collet ring 130 is preferably notched to provide a rough surface for gripping the shielding and pull strength layer 114. Collet ring 130 and clamp nut 140 are preferably formed of aluminum, but may also be formed of any conductive or nonconductive materials that allow an overall pull strength for the conduit-connector assembly of at least 100 pounds to be achieved. A heat shrink tube 132 is then placed around the clamp nut 140 and exposed portions of the shielding and pull strength layer 114 and the outer jacket 112 of conduit 110 to form a watertight and pressure tight seal.

End 24 of connector 20 is preferably externally threaded for threaded engagement with a standard coaxial cable entry port on an optoelectronic converter casing, thereby providing a protective passageway with high pull strength for optical fibers 1 passing between optoelectronic component housings. Since the connector 20 of this invention is not physically connected to the optical fibers contained within the conduit-connector assembly and does not provide a mating connection between optical fibers or between optical fiber pigtails and optoelectronic components, the position or placement of the optical fiber pigtails 1 passing through the conduit-connector assembly is not critical. Spacing and/or dielectric materials are not required to separate the individual optical fibers 1 contained within conduit 10 or passing through connector 20. While connector 20 is permanently connected to at least one end of conduit 10, end 24 of connector 20 is removably attachable to a coaxial cable entry port and may, for example, be screwed in and out of the casing entry port with no deleterious effect on the conduit-connector assembly. Optionally, an O-ring 28, formed, for example, of carbonfilled silicone or neoprene, may be used as a gasket for sealing and EMI shielding of the entry port connection.

A preferred embodiment of conduit 10 is available as a commercial product under the mark "THERMOFIT HELICAL CONVOLEX TUBING" from Raychem Corp. The inner tube 16 is helically convoluted and formed of radiation-crosslinked, modified ethylene tetrafluoroethylene (ETFE). Inner tube 16 has an operating temperature range of $-55°$ C. to 200° C., which exceeds the range of ambient temperatures to which the conduit would likely be exposed in fiber optic applications. Inner tube 16 is highly flexible throughout its operating temperature range, thereby facilitating introduction of the conduit-connector assembly into existing CATV systems. Inner tube 16 is also resistant to fluids and chemicals, thereby protecting the optical fiber pigtails 1 from degradation in outdoor applications. This function is critical because the optical fiber pigtails are not outdoor rated.

The shielding and pull strength layer 14 in the preferred embodiment of conduit 10 is formed of stainless steel braiding, which provides both EMI shielding for optoelectronic components in the connected housings and pull strength for the conduit-connector assembly. Optical fibers do not require EMI shielding because the transmitted signals are in the form of light rather than electric current. However, optoelectronic components, such as fiber optic transmitters and receivers, which are driven by and generate electric current, respectively, are not immune to EMI. The shielding characteristics of braided steel layer 14 prevent EMI from leaking into or from the connector entry port of the optoelectronic component housing, thereby maintaining the EMI integrity of the housing, which itself is typically EMI shielded to protect the internal optoelectronic circuitry. Steel braiding layer 14, in conjunction with thermofit ring 30 of the first embodiment, or the collet ring-clamp nut combination of the second embodiment, further provide the pull strength for the conduit-connector assembly. Preferably, the connection formed between the conduit and connector will withstand tensile forces of up to 100 pounds. The fiber optic pigtails are thereby protected against the application of external tensile stresses, to which optical fibers are particularly susceptible in terms of breakage.

Preferably, the inner diameters of conduit 10 and connector 20 are substantially equal and are sufficiently large to allow at least four optical fiber pigtails therethrough. The inner diameter of the conduit-connector may, however, be increased or decreased to suit particular applications.

From the foregoing description, it will be apparent that there has been provided a novel fiber optic conduit-connector assembly for passing optical fibers between optoelectronic component housings. Various modifications to the preferred embodiments described herein may be apparent to those skilled in the art without departing from the scope of the present invention, which is limited only by the appended claims. Accordingly, the embodiments shown and described are only illustrative, not restrictive.

I claim:

1. A fiber optic conduit-connector assembly comprising:

a conduit having a flexible, crush resistant and fluid resistant inner tube adapted for enclosing at least one optical fiber, an electromagnetic shielding layer disposed circumferentially about said inner tube, and a pressure tight outer layer disposed circumferentially about said shielding layer, said outer layer having an end portion stripped away to expose an end portion of said shielding layer;

an electrically conductive connector fixedly attached to at least one end of said conduit and adapted to allow at least one optical fiber to be passed therethrough; said connector having a first end for attachment to a coaxial cable entry port and a second end having a receptacle for insertion of an end portion of said inner tube;

said inner tube of said conduit having an end portion thereof inserted into said connector receptacle, said end portion of said shielding layer being disposed circumferentially about said second connector end and having connecting means mounted thereon for affixing said shielding layer end portion to said second connector end, and said connecting means and said end portion of said shielding layer having a pressure light tube disposed thereabout; and wherein said inner tube is helical convoluted tubing and said second connector end is internally threaded for engagement with said inner tube.

2. A fiber optic conduit-connector assembly comprising:

a conduit having a flexible, crush resistant and fluid resistant inner tube adapted for enclosing at least one optical fiber, an electromagnetic shielding layer disposed circumferentially about said inner tube, and a pressure tight outer layer disposed circumferentially about said shielding layer, said outer layer having an end portion stripped away to expose an end portion of said shielding layer;

an electrically conductive connector fixedly attached to at least one end of said conduit and adapted to allow at least one optical fiber to be passed therethrough, said connector having a first end for attachment to a coaxial cable entry port and a second end having a receptacle for insertion of an end portion of said inner tube;

said inner tube of said conduit having an end portion thereof inserted into said connector receptacle, said end portion of said shielding layer being disposed circumferentially about said second connector end and having connecting means mounted thereon for affixing said shielding layer end portion to said second connector end, and said connecting means and said end portion of said shielding layer having a pressure tight tube disposed thereabout; and wherein said inner tube is helical convoluted tubing formed of radiation crosslinked ethylene tetrafluoroethylene and said second connector end is internally threaded for engagement with said inner tube.

3. A fiber optic conduit-connector assembly according to claim 2 wherein said electromagnetic shielding layer further provides tensile strength for said conduit-connector assembly.

4. A fiber optic conduit-connector assembly according to claim 3 wherein the tensile strength of said conduit-connector assembly is at least 100 pounds.

5. A fiber optical conduit-connector assembly according to claim 3 wherein said electromagnetic shielding layer is formed of stainless steel braiding.

6. A fiber optic conduit-connector assembly according to claim 3 wherein said electromagnetic shielding layer is formed of copper braiding.

7. A fiber optic conduit-connector assembly according to claim 2 wherein said electromagnetic shielding layer is formed of stainless steel braiding.

8. A fiber optic conduit-connector assembly according to claim 2 wherein said electromagnetic shielding layer is formed of copper braiding.

9. A fiber optic conduit-connector assembly according to claim 2 wherein said outer pressure tight layer is formed of polypropylene.

10. A fiber optic conduit-connector assembly according to claim 2 where said connector is formed of a non-corrosive material.

11. A fiber optic conduit-connector assembly according to claim 2 wherein said connector is formed of aluminum.

12. A fiber optic conduit-connector assembly according to claim 2 wherein said connector is formed of steel.

13. A fiber optical conduit-connector assembly according to claim 2 wherein said connector is formed of an electrically conductive, non-metallic material.

14. A fiber optic conduit-connector assembly according to claim 2 wherein said first connector end is threaded for engagement with a KS-type coaxial cable entry port.

15. A fiber optic conduit-connector assembly according to claim 2 wherein said conduit and said connector have substantially equal inner diameters.

16. A fiber optic conduit-connector assembly according to claim 2 wherein said connecting means comprises a thermofit ring.

17. A fiber optic conduit-connector assembly according to claim 2 wherein said connecting means comprises a collet ring and clamp nut, said collet ring having at least a portion of the external surface thereof threaded for engagement with the internal surface of said clamp nut.

18. A fiber optic conduit-connector assembly according to claim 2 wherein said pressure tight tube is a heat shrink tube.

19. A fiber optic conduit-connector assembly comprising:

a conduit having a flexible, crush resistant and fluid resistant inner tube formed of helical convoluted radiation crosslinked, ethylene tetrafluoroethylene adapted for enclosing at least one optical fiber, an electromagnetic shielding and pull strength layer formed of stainless steel braiding disposed circumferentially about said inner tube, and an outer pressure tight polypropylene layer disposed circumferentially about said shielding layer, said outer layer having an end portion stripped away to expose an end portion of said shielding, and pull strength layer;

an electrically conductive, non-corrosive connector formed of aluminum fixedly attached on at least one end of said conduit and adapted to allow at least one optical fiber to be passed therethrough, said connector having a first threaded end for engagement with a coaxial cable entry port and a second end having an internally threaded receptacle for engagement with an end portion of said inner tube;

said inner tube having an end portion inserted into said connector receptacle, said end portion of said shielding and pull strength layer being disposed circumferentially about an outer surface of said second connector end and having a thermofit ring mounted thereon for affixing said shielding and pull strength layer end portion to said outer surface of said second connector end, and said thermofit ring and said end portion of said shielding and pull strength layer having a pressure-tight heat shrink tube disposed thereabout.

20. A fiber optic conduit-connector assembly comprising:

a conduit having a flexible, crush resistant and fluid resistant inner tube formed of helical convoluted radiation crosslinked, ethylene tetrafluoroethylene adapted for enclosing at least one optical fiber, an electromagnetic shielding and pull strength layer formed of stainless steel braiding disposed circumferentially about said inner tube, and an outer pressure tight polypropylene layer disposed circumferentially about said shielding layer, said outer layer having an end portion stripped away to expose an end portion of said shielding and pull strength layer;

an electrically conductive, non-corrosive connector formed of aluminum fixedly attached on at least one end of said conduit and adapted to allow at least one optical fiber to be passed therethrough, said connector having a first threaded end for engagement with a coaxial cable entry port and a second end having an internally threaded receptacle for engagement with an end portion of said inner tube;

said inner tube having an end portion inserted into said connector receptacle, said end portion of said shielding and pull strength layer being disposed circumferentially about an outer surface of said second connector end and having a collet ring and clamp nut mounted thereon for affixing said shielding and pull strength layer end portion to said outer surface of said second connector end, said collet ring having at least a portion of an external surface thereof threaded for engagement with a threaded internal surface of said clamp nut, and said clamp nut and said end portion of said shielding and pull strength layer having a pressure-tight heat shrink tube disposed thereabout.

21. A connector assembly for use with a conduit having a flexible, crush resistant and fluid resistant inner tube formed of helically convoluted tubing, a layer of electromagnetic shielding disposed circumferentially about said inner tube, and an outer pressure tight layer disposed circumferentially about said shielding layer with an end portion of said outer layer stripped away to expose an end portion of said shielding layer and an end portion of said conduit, said connector assembly comprising:

an electrically conductive connector, adapted to allow at least one optical fiber to be passed therethrough, having a first end for engagement with a coaxial cable entry port, and a second end having a receptacle internally threaded for engagement with said inner tube of said conduit;

said second end of said connector being fixedly attached to said end portion of said conduit, said second connector end having said end portion of said shielding layer disposed circumferentially thereabout and connecting means mounted on said shielding layer end portion for affixing said shielding layer end portion to said second connector end.

22. A connector according to claim 21 wherein said connector is formed of a non-corrosive material.

23. A connector according to claim 21 wherein said connector is formed of aluminum.

24. A connector according to claim 21 wherein said connecting means comprises a thermofit ring.

25. A connector according to claim 21 wherein said connecting means comprises a collet ring and clamp nut, said collet ring having at least a portion of an external surface thereof threaded for engagement with a threaded internal surface of said clamp nut.

* * * * *